US010818192B2

(12) United States Patent
Chen et al.

(10) Patent No.: US 10,818,192 B2
(45) Date of Patent: Oct. 27, 2020

(54) CONFLICT ALERTING METHOD BASED ON CONTROL VOICE

(71) Applicant: THE 28TH RESEARCH INSTITUTE OF CHINA ELECTRONIC TECHNOLOGY GROUP CORPORATION, Nanjing (CN)

(72) Inventors: Ping Chen, Nanjing (CN); Yan Liu, Nanjing (CN); Yongjie Yan, Nanjing (CN); Ruilin Ju, Nanjing (CN); Shane Xu, Nanjing (CN); Hu Wang, Nanjing (CN); Xuefei Xiao, Nanjing (CN); Ming Tong, Nanjing (CN); Jiaqing Li, Nanjing (CN); Yang Zhang, Nanjing (CN)

(73) Assignee: THE 28TH RESEARCH INSTITUTE OF CHINA ELECTRONIC TECHNOLOGY GROUP CORPORATION, Nanjing (CN)

( * ) Notice: Subject to any disclaimer, the term of this patent is extended or adjusted under 35 U.S.C. 154(b) by 315 days.

(21) Appl. No.: 16/071,456

(22) PCT Filed: Apr. 27, 2017

(86) PCT No.: PCT/CN2017/082295
§ 371 (c)(1),
(2) Date: Jul. 19, 2018

(87) PCT Pub. No.: WO2018/152960
PCT Pub. Date: Aug. 30, 2018

(65) Prior Publication Data
US 2020/0302808 A1    Sep. 24, 2020

(30) Foreign Application Priority Data

Feb. 22, 2017   (CN) .......................... 2017 1 0098291

(51) Int. Cl.
G08G 5/04       (2006.01)
G08G 5/00       (2006.01)
G10L 15/26      (2006.01)

(52) U.S. Cl.
CPC ............ *G08G 5/04* (2013.01); *G08G 5/0013* (2013.01); *G10L 15/26* (2013.01)

(58) Field of Classification Search
None
See application file for complete search history.

(56) References Cited

U.S. PATENT DOCUMENTS 6,161,097 A * 12/2000 Glass .................. G06Q 10/025
                                                       342/23
6,278,965 B1 * 8/2001 Glass .................. G06Q 10/025
                                                      701/120

(Continued)

*Primary Examiner* — Jonathan C Kim
(74) *Attorney, Agent, or Firm* — CBM Patent Consulting, LLC

(57) ABSTRACT

A conflict alerting method based on control voice comprises: collecting radio voice messages of a controller and a pilot and converting the radio voice messages into digital signals by an audio card of a control position; converting the digital signals into text messages by a voice recognition function and sending the text messages together to a system server; extracting, by the system server, control commands from the text messages; determining a moving track of an aircraft in a future period of time based on the control commands; identifying a possible dangerous conflict between aircrafts in combination with current location messages, motion parameter messages and future motion tracks of various aircrafts in an air traffic management system, and providing an alert prompt.

7 Claims, 9 Drawing Sheets

(56) References Cited

U.S. PATENT DOCUMENTS

| | | | |
|---|---|---|---|
| 6,828,921 B2* | 12/2004 | Brown | G08G 5/0086 340/945 |
| 7,809,405 B1* | 10/2010 | Rand | G08G 5/0013 455/563 |
| 8,515,763 B2* | 8/2013 | Dong | G10L 15/22 704/275 |
| 8,554,457 B2* | 10/2013 | White | G08G 5/065 701/120 |
| 8,704,701 B2* | 4/2014 | Pschierer | G01S 13/933 342/36 |
| 9,424,755 B2* | 8/2016 | Bailey | G08G 5/0013 |
| 9,443,433 B1* | 9/2016 | Conway | G08G 5/0013 |
| 9,443,434 B2* | 9/2016 | Hale | G08G 5/0039 |
| 9,511,877 B2* | 12/2016 | Masson | A41D 1/002 |
| 9,524,571 B2* | 12/2016 | Coulmeau | G08G 5/0091 |
| 9,530,320 B2* | 12/2016 | Bailey | G08G 5/0013 |
| 9,620,020 B2* | 4/2017 | Wang | G06F 3/16 |
| 9,697,737 B2* | 7/2017 | Hale | G08G 5/0034 |
| 9,766,630 B2* | 9/2017 | Casado Magana | G05D 1/0676 |
| 10,102,760 B1* | 10/2018 | Foltan | G08G 5/0008 |
| 10,121,384 B2* | 11/2018 | Hale | G08G 5/0021 |
| 10,157,616 B2* | 12/2018 | Agarwal | G10L 15/26 |
| 10,193,774 B2* | 1/2019 | Vidyarthi | H04L 41/0631 |
| 10,490,085 B2* | 11/2019 | Cotdeloup | G08G 5/0004 |
| 2006/0095263 A1* | 5/2006 | Kawasaki | 704/257 |
| 2014/0195139 A1* | 7/2014 | Smith | G08G 5/0013 701/120 |
| 2018/0096607 A1* | 4/2018 | Cotdeloup | G08G 5/0021 |
| 2018/0174588 A1* | 6/2018 | Agarwal | G10L 15/01 |
| 2018/0233052 A1* | 8/2018 | Shamasundar | G08G 5/0013 |

* cited by examiner

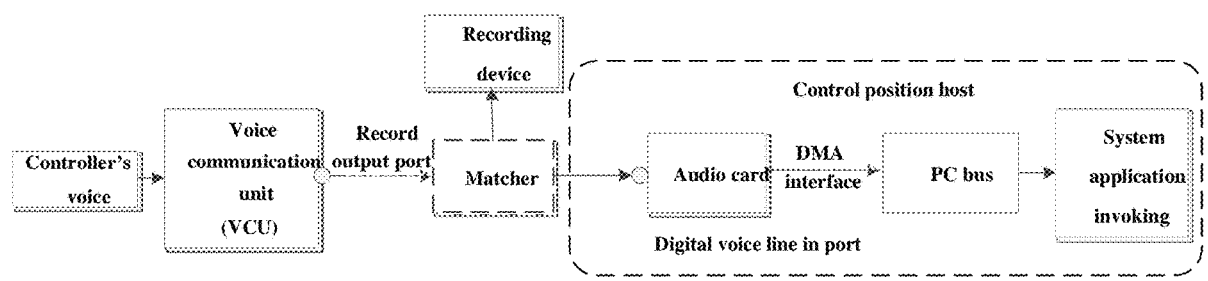
FIG. 3
| CCA3207 | Turn left | 15 degrees | Climb | 2000 meters |
|---|---|---|---|---|
| Aircraft call sign | Command action | Action adverbial | Command action | Action adverbial |
FIG. 4
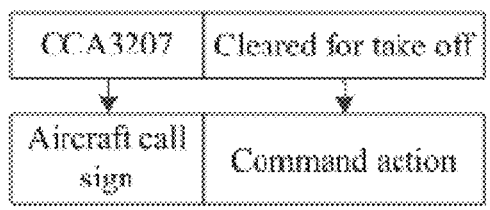
FIG. 5

CONFLICT ALERTING METHOD BASED ON CONTROL VOICE

TECHNICAL FIELD

The present invention belongs to the field of air traffic control and particularly relates to a conflict alerting method based on control voice.

BACKGROUND ART

An air traffic control system generally has the functions of identifying dangerous conflicts between aircrafts and providing an alert prompt. In particular, the system may decide that two airplanes are in conflict in case of determining the current separation between the flight paths of two aircrafts to be smaller than a separation standard. The system may then send an alert signal to a controller. If the system determines that there is a probability of near-miss between positions of two aircrafts extrapolated from their current locations for a period of time without conflict, the system may decide a potential flight conflict between the two aircrafts and send an early warning signal to the controller. At present, some methods on conflict detection at home and abroad mainly include conflict detection based on a genetic algorithm, flight conflict detection based on Kalman filtering, conflict detection based on a neural network, deterministic conflict detection, probabilistic conflict detection, conflict detection based on an unstructured grid and the like, which have their own unique characteristics and have achieved particular effects.

However, the existing researches are only based on the control of an air traffic management system on surveillance messages and flight intention messages. Generally, processing results of message sources, such as surface surveillance and air traffic control radar, are used as the surveillance messages, and flight plans of aircrafts, ACARS messages and the like are used as the flight intention messages. A controller's control commands may also be an important, indispensable factor that decides current and future flight intentions of an aircraft. Especially on an aerodrome surface, there is no specific flight plan message and the operations of aircrafts rely mainly on a controller's commands. Therefore, the determination of dangerous conflicts between aircrafts should rely more on voice commands. In the air traffic management system, there is still a lack of research in this area.

SUMMARY OF THE INVENTION

Objective of the present invention: the invention is expected to be applied to the field of air traffic management for solving the major problem that near-miss may occur between aircrafts when a controller misjudges current aircraft situations and give wrong commands.

To solve the above technical problems, the present invention discloses a conflict alerting method based on control voice, which can be applied to an air traffic management system. This method can assist with calculation of conflict alert by collecting and recognizing control voice and converting control commands into future moving track messages of aircrafts in the system. The method specifically comprises the following steps.

At step 1, voice messages of a radio call between a controller and a pilot of a to-be-handled aircraft are collected. Interval time (generally 2 s) is set with a variable system parameter (VSP). Whether the voice messages are a succession of control commands is determined. If yes, the control commands may be input into a voice line in port of an audio card of a control position via a record output port of a voice communication unit (VCU). Otherwise, such a succession of voice messages are discarded. The audio card converts analog voice signals into digital signals and sends the digital signals to a PC bus.

At step 2, the digital signals collected in step 1 are converted into text messages by using voice recognition software and the text messages are sent to a system server of a control system.

At step 3, a search is performed in the contents of the text messages generated in step 2 according to a control command keyword set already created in a database of the server of the control system to obtain valid control commands including an aircraft call sign (also referred to as flight number, approval number), a command action and an action adverbial.

At step 4, related aircrafts are associated based on the control commands extracted in step 3 in combination with existing aircraft messages in the control system server, and a moving track of the to-be-handled aircraft from current time to future VSP time (e.g., 3 min) is predicted to form a predicted track.

At step 5, determining whether the to-be-handled aircraft is in conflict with other aircraft based on the predicted track obtained in step 4 in combination with a current location, a motion state or a predicted track of other aircraft. If a conflict exits, an alert prompt is provided at the related control position.

The aircraft call sign in step 3 of the present invention comprises an airline name and a flight number represented by three or four digits. Airlines include, for example, Air China (CCA), China Eastern Airlines (CES), Lufthansa German Airlines (DLH), and the like. A control command is composed of messages such as "aircraft call sign", "command action", and "action adverbial", and may also be composed of messages such as "aircraft call sign", and "comma33nd action". Valid action adverbials mainly include runway No. XX, taxiway No. XX, height XX, maintain XX, etc. Valid command actions mainly include ENTER TAXIWAY, LINE UP, CLEARED FOR TAKE-OFF, etc.

Step 3 comprises the following steps.

At step 3-1, the control system server starts a control command recognition program to read the contents of the text message and search in the text message for an airline name in the control command keyword set. After an airline name is obtained, four digits behind are a flight number. For example, "China Eastern" is obtained and four digits behind are found to be "0234", thereby obtaining an aircraft call sign "CES0234". Step 3-2 is performed if the airline name is obtained; otherwise, the control commands are determined to be invalid.

At step 3-2, a search for a command action is performed in the text messages. After a command action is obtained, a letter, a digit, and a unit before or after the command action are an action adverbial. For example, "ENTER TAXIWAY" is obtained and the action adverbial behind is "L35", thereby obtaining the whole command "CES0234 ENTER TAXIWAY L35". If a combination of a aircraft call sign, a command action and an action adverbial or a combination of an aircraft call sign and a command action is obtained, the control command is determined to be valid; otherwise, the control command is determined to be invalid.

Step 4 comprises the following steps.

At step 4-1, a target identifier (e.g., a flight number) is extracted from the control commands, and the identifier is associated with all flight tracks in the system. The target to which the control commands are directed is found from system targets, and a track of the target is predicted.

At step 4-2, future moving track prediction is performed: a moving track in future VSP time (e.g., 3 min) is predicted by a direct extrapolation method and a prediction method in combination with basic air traffic management data.

In step 4-2, if a control command is changing of a motion position, a moving track in future VSP time is predicted by a track extrapolation method; and if a command is consistent with a planned track, a motion track is predicted based on the fusion of a real-time motion state and the planned track. This step specifically includes:

With consideration of the motion of the target in a two-dimensional plane, $\dot{x}(t)$, $\dot{y}(t)$, $\dot{v}(t)$ and $\dot{\varphi}(t)$ are calculated according to the following two-dimensional target kinematic equations, where $\dot{x}(t)$ represents an x-direction speed; $\dot{y}(t)$ represents a y-direction speed; $\dot{v}(t)$ represents a tangential acceleration of the target; and $\dot{\varphi}(t)$ represents a turning acceleration of the target:

$$\begin{cases} \dot{x}(t) = v(t)\cos\varphi(t) \\ \dot{y}(t) = v(t)\sin\varphi(t) \\ \dot{v}(t) = a_q(t) \\ \dot{\varphi}(t) = a_f(t)/v(t) \end{cases},$$

where (x, y) represents a location of the target; v(t) represents a tangential speed of the target; $\varphi(t)$ represents an angle of heading change of the target; $a_q(t)$ and $a_f(t)$ represent a tangential acceleration and a normal acceleration of motion of the target, respectively; and t represents seconds relative to an initial state, ranging from 0 to 65535. Assuming that $a_q(t)=0$ and $a_f(t)$ is a constant, the motion of the target includes the following two forms:

When $a_f(t)=0$, the target is in linear motion.
When $a_f(t)\neq 0$, the target is in uniform curvilinear motion.
Given $\omega=\dot{\varphi}(t)$ i.e., $\omega$ represents an angular speed of turning of the target.

An angular speed $\omega$ of turning of the target at moment k+1 is calculated by the following equation:

$$\omega_{k+1} = e^{-T/\tau_\omega}\omega_k + W_{\omega,k},$$

where $\omega_k$ represents an angular speed of turning at moment k; T represents a sampling interval; $\tau_\omega$ represents a time-dependent constant of the angular speed; and $W_{\omega,k}$ represents white noise.

A target extrapolation model is as shown in the following equation:

$$X_{k+1} = A(\omega)X_k + BW_k,$$

where $X_k = [x_k, v_{xk}, y_k, v_{yk}]^T$ and $x_k, v_{xk}, y_k, v_{yk}$ represent an x-direction location, an x-direction speed, a y-direction location and a y-direction speed of the target at moment k, respectively; $W_k$ represents white noise; and a noise matrix B is as shown in the following equation:

$$B = \begin{bmatrix} T^2/2 & T & 0 & 0 \\ 0 & 0 & T^2/2 & T \end{bmatrix}^T,$$

A transition matrix $A(\omega)$ which is obtained by discretizing the two-dimensional target kinematic equations is in two forms:

when $\omega=0$, $$A(\omega) = \begin{bmatrix} 1 & T & 0 & 0 \\ 0 & 1 & 0 & 0 \\ 0 & 0 & 1 & T \\ 0 & 0 & 0 & 1 \end{bmatrix},$$

when $\omega\neq 0$, $$A(\omega) = \begin{bmatrix} 1 & \sin\omega T/\omega & 0 & \cos\omega T - 1/\omega \\ 0 & \cos\omega T & 0 & -\sin\omega T \\ 0 & 1-\cos\omega T/\omega & 1 & \sin\omega T/\omega \\ 0 & \sin\omega T & 0 & \cos\omega T \end{bmatrix},$$

The x-direction location $x_k$, the x-direction speed $v_{xk}$, the y-direction location $y_k$ and the y-direction speed $v_{yk}$ of an extrapolated track at moment k are obtained by matrix calculation.

In step 4-2, if a control command contains messages such as aerodrome runway, runway holding point, taxiway, take-off procedure, landing procedure, stand, airway route, gate point, navigation point and the like, such messages are used to predict a moving track in future VSP time.

Step 5 comprises the following steps:

At step 5-1, determination parameters are set, including prediction time, a horizontal separation standard and a vertical separation standard, where the prediction time is the time of forward prediction of the system during conflict determination; the horizontal separation standard is a minimum horizontal separation that needs to be satisfied between aircrafts, and the vertical separation standard is a minimum vertical separation that needs to be satisfied between aircrafts, At step 5-2, conflict pre-determination is performed to exclude aircrafts that are moving away from the to-be-handled aircraft and to exclude aircrafts at a distance exceeding a particular range (generally 100 km) with the to-be-handled aircraft.

At step 5-3, conflict determination is performed on the to-be-handled aircraft and all other aircrafts: conflict determination is performed at intervals of set interval time (e.g., 3 s) until the set maximum prediction time (e.g., 3 min) expires; whether horizontal separations between the to-be-handled aircraft and other aircrafts meet the horizontal separation standard is determined, and whether vertical separations between the to-be-handled aircraft and other aircrafts meet the vertical separation standard is determined. It is determined that a conflict exits once simultaneous violation of the horizontal and vertical separation standards occurs at a time.

At step 5-4, an alert prompt is provided, where the alert prompt includes such messages as flight numbers of two aircrafts, the time to collision, and a predicted collision place.

Step 5-3 comprises the following steps.

At step 5-3-1, a current state of aircraft A is denoted by a tuple (x1, y1, v1, h1, t1), where (x1, y1) represents geographical projection coordinates of aircraft A at a current moment t1; v1 represents a speed of aircraft A at the current moment t1; and h1 represents a height of aircraft A at the current moment t1. A current state of aircraft B is denoted by a tuple (x2, y2, v2, h2, t1), wherein (x2, y2) represents geographical projection coordinates of aircraft B at the current moment t1; v2 represents a speed of aircraft B at the current moment t1; and h2 represents a height of aircraft B at the current moment t1. Extrapolation of maintained speed and heading in future 5 s is performed on aircraft A and aircraft B, respectively, wherein the states of aircraft A and aircraft B after the extrapolation are (x3, y3, v1, h3, t1+5) and (x4, y4, v2, h4, t1+5), respectively; respective flying distances of aircraft A and aircraft B relative to the current moment after the extrapolation are denoted by s1 and s2, respectively; the horizontal separation standard is set to d, and the vertical separation standard is set to K;

At step 5-3-2, whether the vertical separation standard is violated is determined: if |h1−h2|≥K, K representing the vertical separation standard, it is determined that the vertical separation standard is not violated, and the determination flow is ended. Otherwise, it is determined that the vertical separation standard is violated, and step 5-3-3 is performed.

At step 5-3-3, whether the horizontal separation standard is violated is determined:

Variables A, B and C are calculated by the following equations:

$$A = \left(\frac{x3-x1}{s1} \cdot v1 - \frac{x4-x2}{s2} \cdot v2\right)^2 + \left(\frac{y3-y1}{s1} \cdot v1 - \frac{y4-y2}{s2} \cdot v2\right)^2,$$

$$B = 2 \cdot \left(\frac{x3-x1}{s1} \cdot v1 - \frac{x4-x2}{s2} \cdot v2\right) \cdot$$

$$\left(x1 - x2 - \frac{x3-x1}{s1} \cdot v1 \cdot t1 + \frac{x4-x2}{s2} \cdot v2 \cdot t1\right) +$$

$$2 \cdot \left(\frac{y3-y1}{s1} \cdot v1 - \frac{y4-y2}{s2} \cdot v2\right) \cdot$$

$$\left(y1 - y2 - \frac{y3-y1}{s1} \cdot v1 \cdot t1 + \frac{y4-y2}{s2} \cdot v2 \cdot t1\right),$$

$$C = \left(x1 - x2 - \frac{x3-x1}{s1} \cdot v1 \cdot t1 + \frac{x4-x2}{s2} \cdot v2 \cdot t1\right)^2 +$$

$$\left(y1 - y2 - \frac{y3-y1}{s1} \cdot v1 \cdot t1 + \frac{y4-y2}{s2} \cdot v2 \cdot t1\right)^2 - d^2.$$

Δ is calculated by the following equation:

$$\Delta = B^2 - 4AC.$$

The sign of Δ is determined:

If Δ=0, given ta=−B, whether to is within an interval (t1, t1+5) is determined. If yes, it is determined that the horizontal separation standard is violated with a conflict exiting. Otherwise, it is determined that the horizontal separation standard is not violated;

If Δ>0, given ta=−B−√Δ/(2A), tb=−B+√Δ/(2A), whether ta or tb is within an interval (t1, t1+5) is determined. If yes, it is determined that the horizontal separation standard is violated with a conflict exiting. Otherwise, it is determined that the horizontal separation standard is not violated.

If Δ<0, it is determined that the horizontal separation standard is not violated.

The present invention can be applied to air traffic management systems, including surface, tower, approach and area controls. When a problem occurs in a controller's control command process, voice messages in the control process may be collected by an air traffic management system and converted into a future moving track of an aircraft, thereby allowing for conflict prediction. According to the present invention, a motion trend of an aircraft may be identified based on a controller's radio voice messages so as to effectively identify a dangerous conflict between aircrafts.

Beneficial effects: the present invention produces the following technical effects:

1. A conflict alerting method that has never been used is provided for an air traffic management system with full consideration of a controller's control intentions.
2. According to the present invention, a dangerous conflict between aircrafts in a future period of time from current time due to control behaviors of a controller can be effectively determined.
3. A technical means is provided for importing of control radio call messages into the system.
4. A technical means is provided for extracting a control command from control voice.
5. A technical means is provided for converting a control command into a future moving track of an aircraft.
6. A technical means is provided for conflict alert determination between aircrafts by using a future moving track.

BRIEF DESCRIPTION OF THE DRAWINGS

The present invention will be further described below in detail in conjunction with the accompanying drawings and specific embodiments, so that the above advantages or advantages in other aspects of the invention can become more apparent.

FIG. 3 illustrates a working principle of control voice collection.

FIG. 4 illustrates a composition of a control command.

FIG. 5 illustrates a composition of a control command.

DETAILED DESCRIPTION

The present invention will be further described in detail in conjunction with the accompanying drawings.

Figure 1:
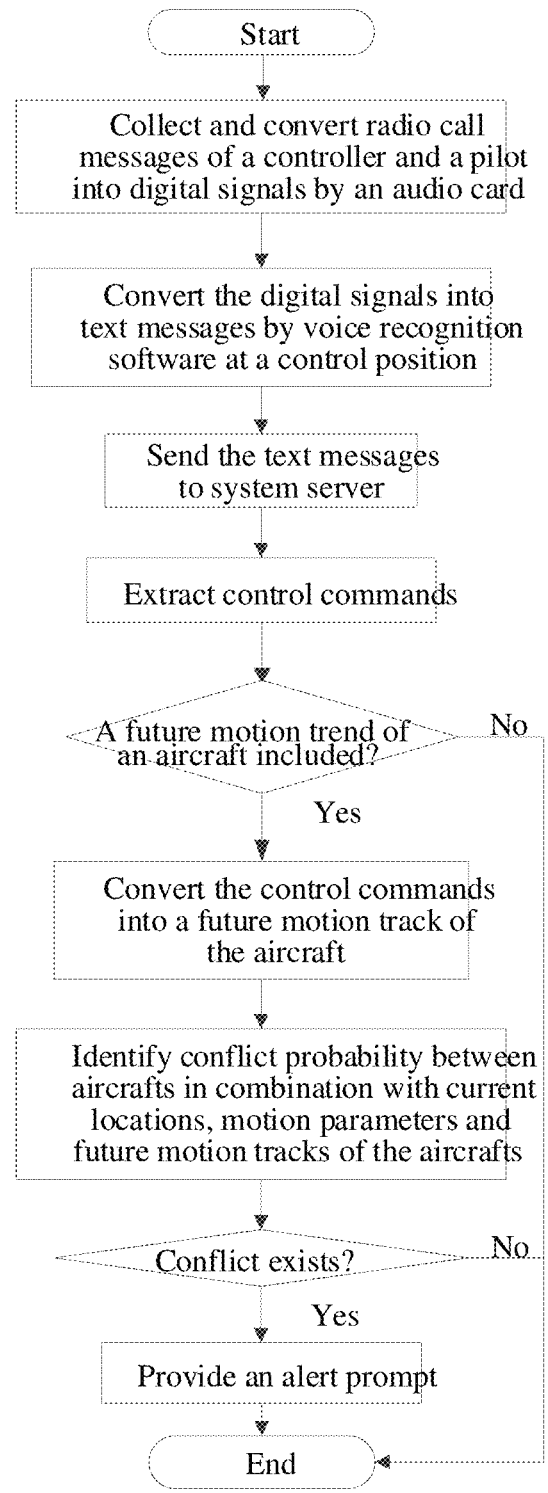
FIG. 1 illustrates a flowchart of a method of the present invention.

An execution flow of the present invention, as shown in FIG. 1, particularly comprises the following steps.

At step 1, voice messages of a radio call between a controller and a pilot of a to-be-handled aircraft are collected. Interval time (generally 2 s) is set with a variable system parameter (VSP). Whether the voice messages are a succession of control commands is determined. If yes, the control commands may be input into a voice line in port of an audio card of a control position via a record output port of a voice communication unit (VCU). Otherwise, such a succession of voice messages may be discarded. The audio card converts analog voice signals into digital signals and sends the digital signals to a PC bus.

Figure 2:
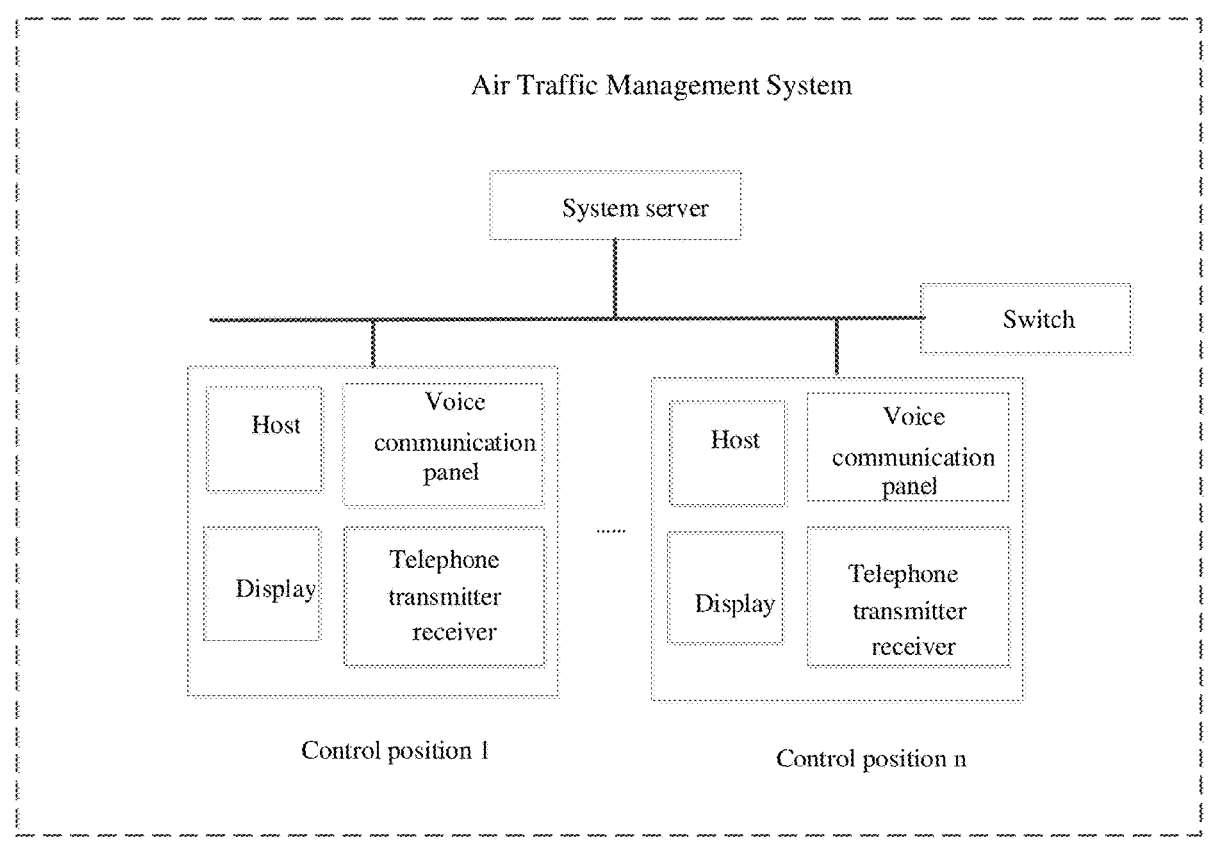
FIG. 2 illustrates a configuration of devices of an air traffic management system related to the present invention.

The following are detailed descriptions.
(a) Brief description of a configuration of devices of an air traffic management system related to the present invention:
1. Air Traffic Management System As shown in FIG. 2, an air traffic management system generally comprises a system server, n control positions, a voice communication unit (VCU), a network switch, etc. Each control position includes a host, a display, a voice communication panel, a telephone transmitter-receiver, etc.

2. System Server

The system server serves to process messages of surveillance, flight plans, weather, etc., fuse voice recognition messages and surveillance messages, perform conflict alert determination, and so on.

3. Control Position

The control position generally consists of one host, and one or more displays. The control position serves as an interaction interface between a controller and a control system to achieve display and manual input of messages of background maps, aircraft positions, conflict alerts, and the like.

4. Voice Communication Unit

The voice communication unit generally consists of a voice communication panel, and a telephone transmitter-receiver, and mainly serves to achieve ground-to-air radio calls between controllers and pilots as well as ground-to-ground calls. The voice communication unit is arranged on a control position and configured to collect a call between a controller and a pilot in the present invention.

(b) Voice Collection Process

As shown in FIG. 3, voice messages of a call between a controller and a pilot may be input via a record output port of a voice communication unit (VCU), delivered to a voice line in port of an audio card in a host of a control position via the matcher, and then entered into a PC bus by the audio card via a DMA interface for invoking by the system.

For example, the contents of a call between a controller and pilots are as follows:

Controller (C): China eastern four six seven zero, after the landing traffic, line up and wait behind.
Pilot A ($P_A$): After the landing traffic, line up and wait behind, china eastern four six seven zero.
C: China eastern four six seven zero, Dongfang tower, runway L18, cleared for take off.
$P_A$: Cleared for take off, runway L18, China eastern four six seven zero.
C: China eastern four six seven zero, take off immediately or vacate runway.
C: Shenzhen air eight nine zero one, taxi to stand B213 via taxiway D2.
$P_B$: Taxi to stand B213 via taxiway D2, Shenzhen air eight nine zero one, good day.

The above voice messages may be collected to the audio card and converted into digital signals.

At step 2, the digital signals collected in step 1 are converted into text messages by using voice recognition software and the text messages are sent to a system server of a control system. This step may specifically include the following process.

The control position is added with a voice recognition program that is integrated with a voice development kit and configured to perform voice recognition and store the converted text messages in a file ATCVoice.dat.

For example, the converted text messages are as follows:
China eastern four six seven zero, after the landing traffic, line up and wait behind.
China eastern four six seven zero, Dongfang tower, runway L18, cleared for take off.
China eastern four six seven zero, take off immediately or vacate runway.
Shenzhen air eight nine zero one, taxi to stand B213 via taxiway D2.

At step 3, as shown in FIG. 4 and FIG. 5, a search is performed in the contents of the text messages generated in step 2 according to a control command keyword set already created in a database of the server of the control system to obtain valid control commands including an aircraft call sign, a command action and an action adverbial. This step may specifically include the following process.

(a) Composition of Control Command

A control command may be composed of messages such as "aircraft call sign", "command action", and "action adverbial", and may also be composed of messages such as "aircraft call sign", and "command action".

(b) Creation of Command Set

A valid aircraft call sign is composed of an airline name and a three-digit (or four-digit) number. Airlines in China mainly include AIR CHINA, China Eastern Airlines, China Southern Airlines, Sichuan Airlines, Jinxiu Airlines, Tibet Airlines, Lucky Air, Air China Cargo, Spring Airlines, Okay Airways, Grand China Express, Shanghai Airlines, Xiamen Airlines, Hainan Airlines, Deer Air, Shenzhen Airlines, Chongqing Airlines, West Air, Shandong Airlines, China Southwest Airlines, Xinjiang Airlines, Grand China Air, Juneyao Airlines, China United Airlines, KUNPENG Airlines, Yangtze River Express, Yunnan Airlines, Capital Airlines, etc. Foreign airlines mainly include American Airlines, Asiana Airlines, Air France, British Airways, Alitalia, Lufthansa German Airlines, Air Canada, Air Finland, etc.

Valid command actions mainly include ENTER TAXIWAY, ENTER RUNWAY, CLEARED FOR TAKE-OFF, CANCEL TAKE-OFF, DEPARTURE PROCEDURE, CLIMB TO, CLIMB, ON, CONTINUE CLIMB, CROSS, ACCELERATE, REGULATE SPEED, REDUCE SPEED, INCREASE SPEED, TURN LEFT, TURN RIGHT, LEFT OFFSET, RIGHT OFFSET, CANCEL OFFSET, ROUTE FLIGHT, JOIN ROUTE, DESCEND TO, DESCEND, DOWN, APPROACH PROCEDURE, MAINTAIN INDICATED AIRSPEED, APPROACH, JOIN X LEG, CIRCLE, GO AROUND, LANDING, ETC.

Valid action adverbials mainly include runway No. XX, holding point No. XX, taxiway No. XX, height XX, maintain XX, speed XX, route number XX, gate No. XX, turn to heading XX, offset angle XX, approach line No. XX, etc.

(c) Search of Control Commands

After the conversion of new text messages by the control position, the text messages are sent to the system server, and the control command recognition program COMMAND of the system server is notified of reading the text messages to recognize control commands.

At the beginning, a search is performed in free texts for airline name in a control command keyword set. After an airline name is obtained, four digits behind are a flight number. For example, "China Eastern" is obtained and four digits behind are found to be "0234", thereby obtaining an aircraft call sign "CES0234".

Then, a search for a command action is performed. After a command action is obtained, a letter, a digit, and a unit before or after the command action are an action adverbial. For example, "ENTER TAXIWAY" is obtained and the action adverbial behind is "L35", thereby obtaining the whole command "CES0234 ENTER TAXIWAY L35".

If a combination of "aircraft call sign", "command action" and "action adverbial" or a combination of "aircraft call sign" and "action adverbial" is obtained, the control command is considered valid. For example, the following control commands are recognized from the above example:

CES4670, cleared for take off.
CSZ8901, taxiway D2.

Figure 6:
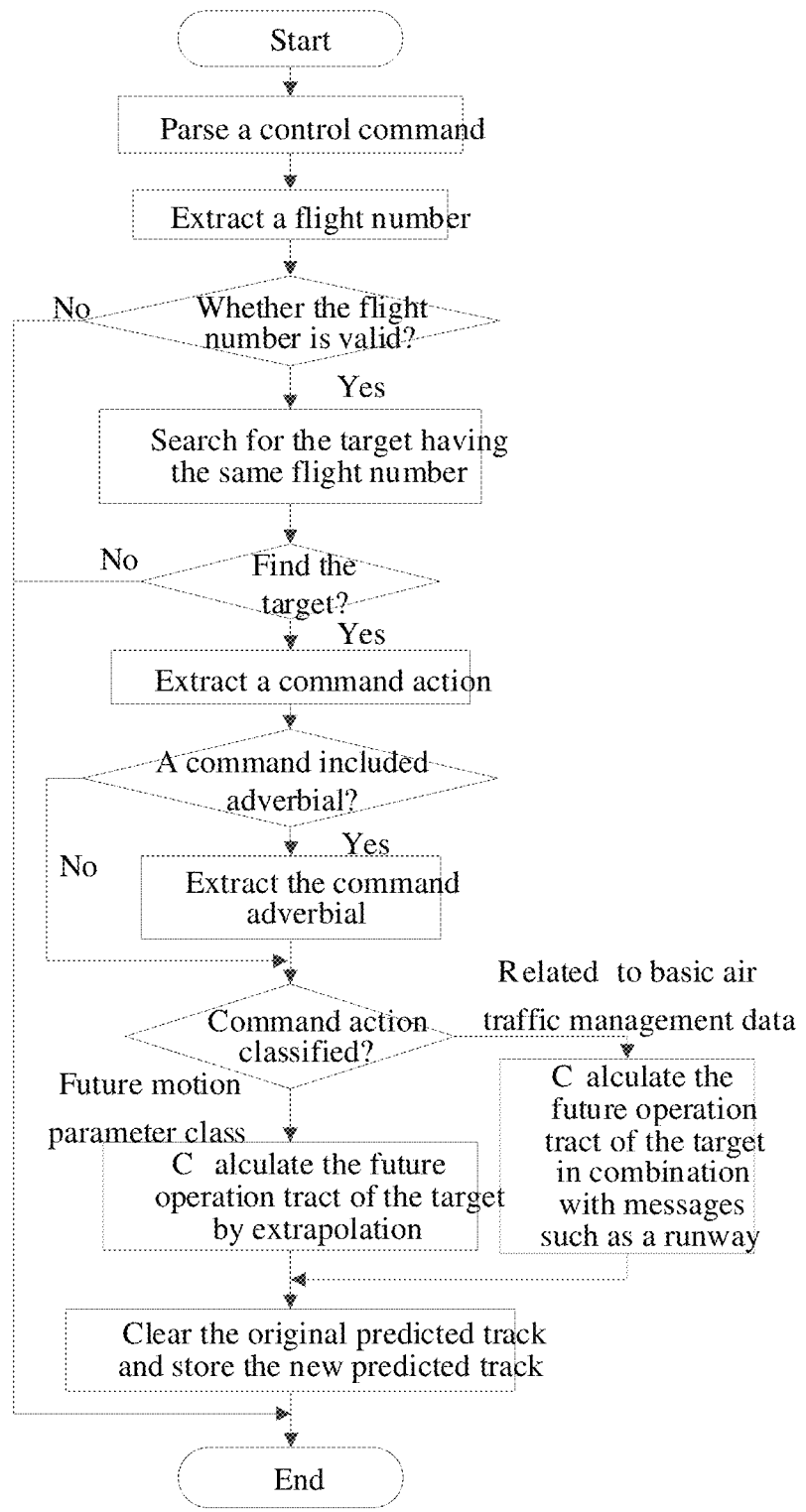
FIG. 6 illustrates a flowchart of predicting a future moving track of an aircraft.

At step 4, as shown in FIG. 6, a related aircraft is searched for based on the extracted control commands in combination with existing aircraft messages in the control system, and a moving track of the aircraft in future VSP time (e.g., 3 min) is predicted to form a predicted track. This step may specifically include the following process.

(a) Target Association

The program COMMAND

The COMMAND program sends the control command to a voice recognition and surveillance message fusion processing program of the system server, and the control command is parsed. After parsing, a flight number is extracted, and whether the flight number is valid. If yes, the surveillance message fusion processing program performs matching of aircraft call sign (referred to as "flight number" in the system) to obtain a target consistent with the aircraft call sign in the control command from system tracks, and track prediction is performed on the target. If the flight number is invalid, the parsing is ended.

(b) Future Moving Track Prediction

One is direct extrapolation, and the other needs to be combined with basic air traffic management data.

1. Direct extrapolation method. If a control command is changing of a motion position, such as changing in heading, height, and speed, a moving track in future VSP time (e.g., 3 min) may be predicted by a track extrapolation method. If a command is "CES0234 turn left 45 degrees", the heading may be adjusted 45 degrees according to a current speed and a current heading to predict a moving track. If a command is consistent with a planned track, a moving track may be predicted based on the fusion of a real-time motion state and the planned track. The specific algorithm is as follows.

With consideration of the motion of a target in a two-dimensional plane, $\dot{x}(t)$, $\dot{y}(t)$, $\dot{v}(t)$ and $\dot{\varphi}(t)$ are calculated according to the following two-dimensional target kinematic equations:

$$\begin{cases} \dot{x}(t) = v(t)\cos\varphi(t) \\ \dot{y}(t) = v(t)\sin\varphi(t) \\ \dot{v}(t) = a_q(t) \\ \dot{\varphi}(t) = a_f(t)/v(t) \end{cases} \quad (1)$$

In the above equations, (x, y) represents a location of the target; v(t) represents a tangential speed of the target; $\varphi(t)$ represents an angle of heading change of the target; $a_q(t)$ and $a_f(t)$ represent a tangential acceleration and a normal acceleration of motion of the target, respectively. With regard to an aircraft, the target mainly performs uniform rectilinear motion and uniform turning motion except in particular phases (e.g., take-off, climb and the like). Accordingly, a further assumption is made, i.e., $a_q(t)=0$ and $a_f(t)=$constant. Thus, the motion of the target includes the following two forms.

(1) When $a_f(t)=0$, the target is in linear motion.
(2) When $a_f(t)\neq 0$, the target is in uniform curvilinear motion.

Figure 7:
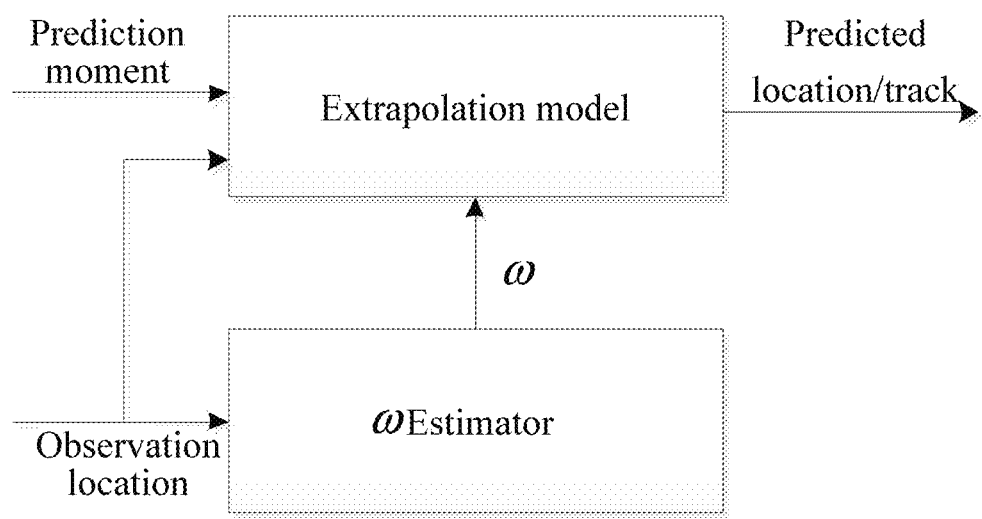
FIG. 7 illustrates an algorithm structure of direct extrapolation.

Given $\omega=\dot{\varphi}(t)$, i.e., $\omega$ represents an angular speed of turning of the target. An extrapolation model for direct extrapolation of the target and model parameters all depend on $\omega$, and therefore, the following algorithm structure of direct extrapolation may be formed, as shown in FIG. 7, which includes a $\omega$ estimator and an extrapolation model.

(1) $\omega$ Estimator

The angular speed of turning of the target may be estimated according to:

$$\omega_{k+1} = e^{-T/\tau_\omega}\omega_k + W_{\omega,k} \quad (2)$$

In the above equation, $\omega_k$ and $\omega_{k+1}$ represent an angular speed of turning at moment k and an angular speed of turning at moment k+1, respectively; T represents a sampling interval; $\tau_\omega$ represents a time-dependent constant of the angular speed; and $W_{\omega,k}$ represents white noise. The equation (2) may be solved by the least square method according to observation inputs.

(2) Extrapolation Model

A target extrapolation model is:

$$X_{k+1} = A(\omega)X_k + BW_k \quad (3)$$

In the above equation, $X_k=[x_k, v_{xk}, y_k, v_{yk}]^T$, $x_k$, $v_{xk}$, $y_k$, $v_{yk}$ represent an x-direction location, an x-direction speed, a y-direction location and a y-direction speed of the target at moment k, respectively; $W_k$ represents white noise; and a noise matrix is as shown in the following equation (4).

$$B = \begin{bmatrix} T^2/2 & T & 0 & 0 \\ 0 & 0 & T^2/2 & T \end{bmatrix}^T \quad (4)$$

A transition matrix $A(\omega)$, which is obtained by discretizing the two-dimensional target kinematic equations, depends on the angular speed $\omega$ of turning, and may be in two forms.

When $\omega=0$, $$A(\omega) = \begin{bmatrix} 1 & T & 0 & 0 \\ 0 & 1 & 0 & 0 \\ 0 & 0 & 1 & T \\ 0 & 0 & 0 & 1 \end{bmatrix} \quad (5)$$

When $\omega \neq 0$, $$A(\omega) = \begin{bmatrix} 1 & \sin\omega T/\omega & 0 & \cos\omega T - 1/\omega \\ 0 & \cos\omega T & 0 & -\sin\omega T \\ 0 & 1-\cos\omega T/\omega & 1 & \sin\omega T/\omega \\ 0 & \sin\omega T & 0 & \cos\omega T \end{bmatrix} \quad (6)$$

The x-direction location $x_k$, x-direction speed $v_{xk}$, y-direction location $y_k$ and y-direction speed $v_{yk}$ of an extrapolated track at moment k may be obtained by matrix calculation.

2. Method in combination with basic air traffic management data. If a control command contains messages such as aerodrome runway, runway holding point, taxiway, take-off procedure, landing procedure, hardstand, airway route, gate point, navigation point and the like, such messages may be used to predict a moving track in future 3 min. If a command is "CES0234 cleared for take off", a motion track needs to be predicted in combination with runway, departure procedure and the principle of conservation of energy. The following description is made with an example of future track prediction in the take-off roll phase.

The vertical profile mainly represents the longitudinal motion of an aircraft, and external forces borne by the aircraft in this process mainly include engine thrust, lift, drag, self-gravity and the ground friction force of the take-off roll period. An aircraft performance library provides performance parameters such as thrust adopted by each type of aircraft in each flight phase. Model equations are set up by using Newton's second law and the principle of conservation of energy:

$$\begin{cases} m\dfrac{dv}{dt} = F\cos(\alpha+\varphi_p) - D - mg\sin\theta \\ mv\dfrac{d\theta}{dt} = F\sin(\alpha+\varphi_p) + L - mg\cos\theta \end{cases} \quad (7)$$

$$(F-D)v_{TAS} = mg\dfrac{dh}{dt} + mv_{TAS}\dfrac{dv_{TAS}}{dt} \quad (8)$$

In the above equations, m is aircraft weight; g is gravity acceleration; h is the height of the aircraft; engine thrust F in the direction of the engine axis forms an engine erection angle $\varphi_p$ with the fuselage axis; lift L is perpendicular to flying speed v; drag D is parallel to the flying speed; $\alpha$ represents an angle of attack; $\theta$ represents a track angle; and $v_{TAS}$ represents a flying true airspeed. In the above equation, $D = C_D \rho v_{TAS}^2 S/2$, and $L = C_L \rho v_{TAS}^2 S/2$, where $C_D$ and $C_L$ represent a drag coefficient and a lift coefficient given by aircraft performance parameters; $\rho$ represents an air density; and S represents the wing area. The time for the aircraft speed increased from zero to the lift-off speed (performance parameter specified value) and a distance in the take-off roll phase may be obtained by means of equations (7) and (8), thereby allowing for prediction of a moving track.

(c) Illustration

Figure 8:
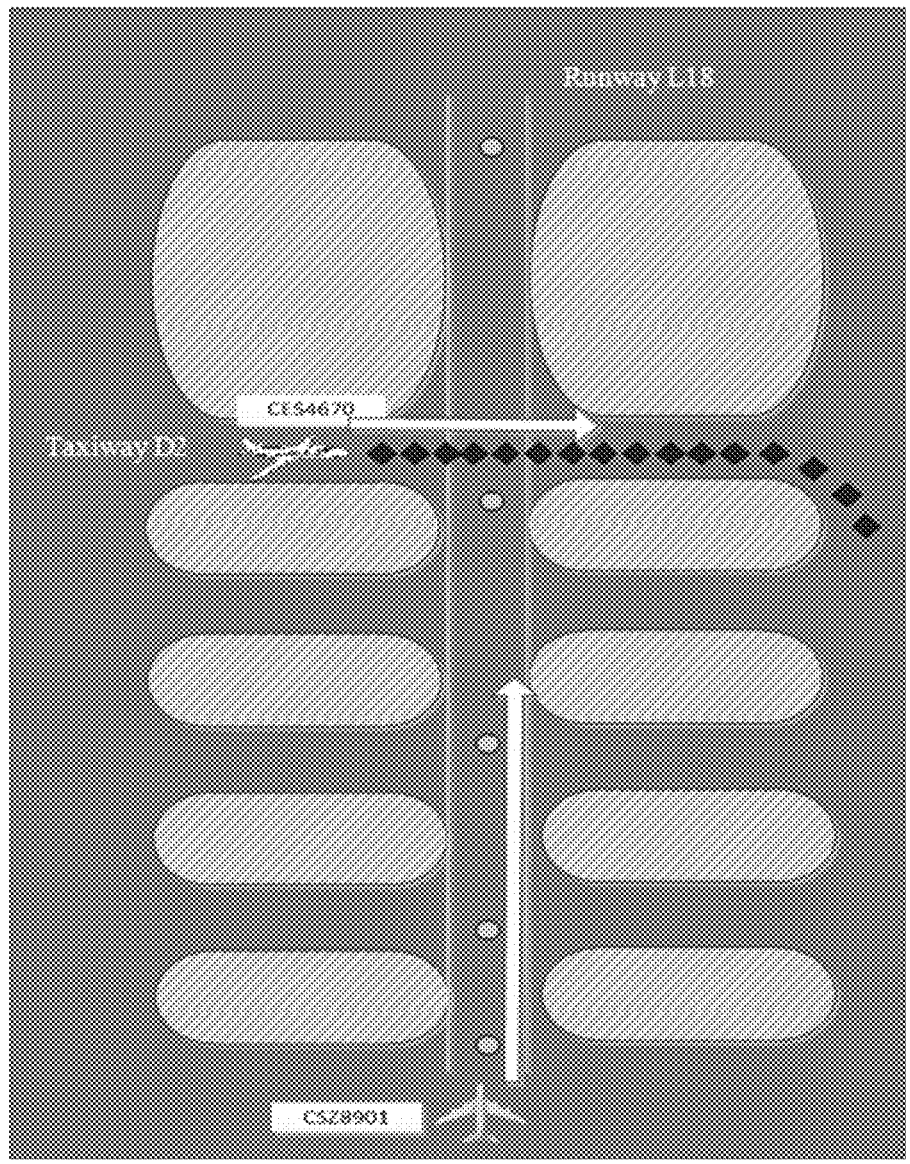
FIG. 8 illustrates a diagram of a motion trend determination example.

In combination with the above example, as shown in FIG. 8, the motion trends of CES 4670 and the CSZ8901 are determined, respectively, with reference to the messages of runway L18 and taxiway D2 in basic data during the determination process. In this figure, the rhombic mark represents the predicted moving track for CES4670, and the middle circular mark represents the predicted moving track for CSZ8901, both in the density of one dot per 5 s.

Figure 9:
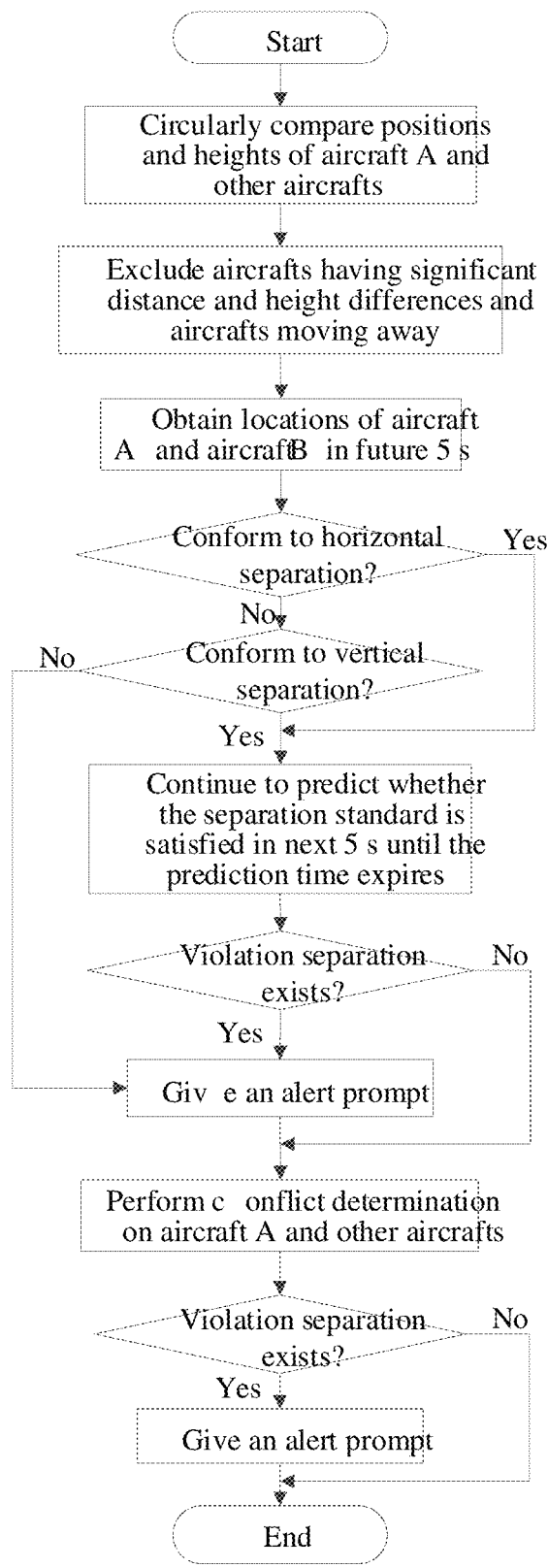
FIG. 9 illustrates a flowchart of determining a conflict between aircrafts.

At step 5, as shown in FIG. 9, whether the aircraft has the probability of near-miss with other aircraft is determined based on the predicted track of the aircraft in combination with a current location, a motion state or a predicted track of other aircraft, and if yes, an alert prompt is provided at the related control position. This step may specifically include the following process.

(a) Parameter Setting

Conflict determination parameters include prediction time, a horizontal separation standard and a vertical separation standard, and the parameter standards are adjustable according to the requirements of various air traffic management systems, as shown in table 1 and table 2.

TABLE 1

Conflict determination adaptive parameters

| Standard Classification | Horizontal separation ≤ (Default) | Prediction time (Default) |
|---|---|---|
| Aerodrome perimeter Approach | (50-1000 m) 200 m 6-10 km | 15-60 s (1 min) 15-60 s |

TABLE 1-continued

Conflict determination adaptive parameters

| Standard Classification | Horizontal separation ≤ (Default) | Prediction time (Default) |
|---|---|---|
| control Area control | (6 km) 10-20 km (19 km) | (1 min) 60-120 s (2 min) |

TABLE 2

Vertical separation defaults

| | | Vertical separation | | | |
|---|---|---|---|---|---|
| | | | CVSM airspace | | |
| Classification Standard | Surface Surface roll, take-off | Aerodrome perimeter 600 m below | 600-8400 (inclusive) | 8400 above | RVSM 8400-12500 (inclusive) |
| Alert ≤ | Not determined | 100 m | 180 m | 450 m | 180 m |

(b) Excluding of Irrelevant Targets

Firstly, conflict pre-determination is performed. Aircrafts that are moving away from aircraft A can be excluded, and aircrafts at a distance of more than 100 km with aircraft A can be excluded too.

(c) Conflict Determination

Conflict determination is performed on aircraft A and all other aircrafts in combination with the current track position, flying parameters and the used separation standards. Firstly, horizontal conflict determination is performed. When there is a horizontal conflict, vertical conflict detection is performed. The locations of aircraft A in future 5 s are obtained, and the locations of aircraft A in future 5 s are predicted. Whether the horizontal locations of aircrafts meet the separation standard is determined. When the horizontal separation violates the standard, vertical separation determination is performed. Then, location relationships between aircrafts are determined at intervals of 5 s, until the prediction time expires. It can be considered that there is a conflict once simultaneous violation of the horizontal and vertical separation standards occurs at a time. Specific calculation steps are as follows.

Tuple (x, y, v, h, t) is employed to represent the state of an aircraft at moment t, where (x, y) represents geographical projection coordinates of the aircraft at current moment t; v represents the speed of the aircraft at moment t; and h represents the height of the aircraft at moment t. Let the current state of aircraft A be (x1, y1, v1, h1, t1) and the current state of aircraft B be (x2, y2, v2, h2, t1). Extrapolation of maintained speed and heading in future 5 s is performed on aircraft A and aircraft B, respectively, and the states of the aircrafts after the extrapolation are (x3, y3, v1, h3, t1+5) and (x4, y4, v2, h4, t1+5), respectively. The respective flying distances of aircraft A and aircraft B relative to the current moment after the extrapolation are denoted by s1 and s2, respectively. The horizontal separation standard is set to d, and the vertical separation standard is set to K.

At step 1, whether the vertical separation standard is violated is determined, and the vertical separation standard is not violated on condition that |h1−h2|≥K.

Figure 10:
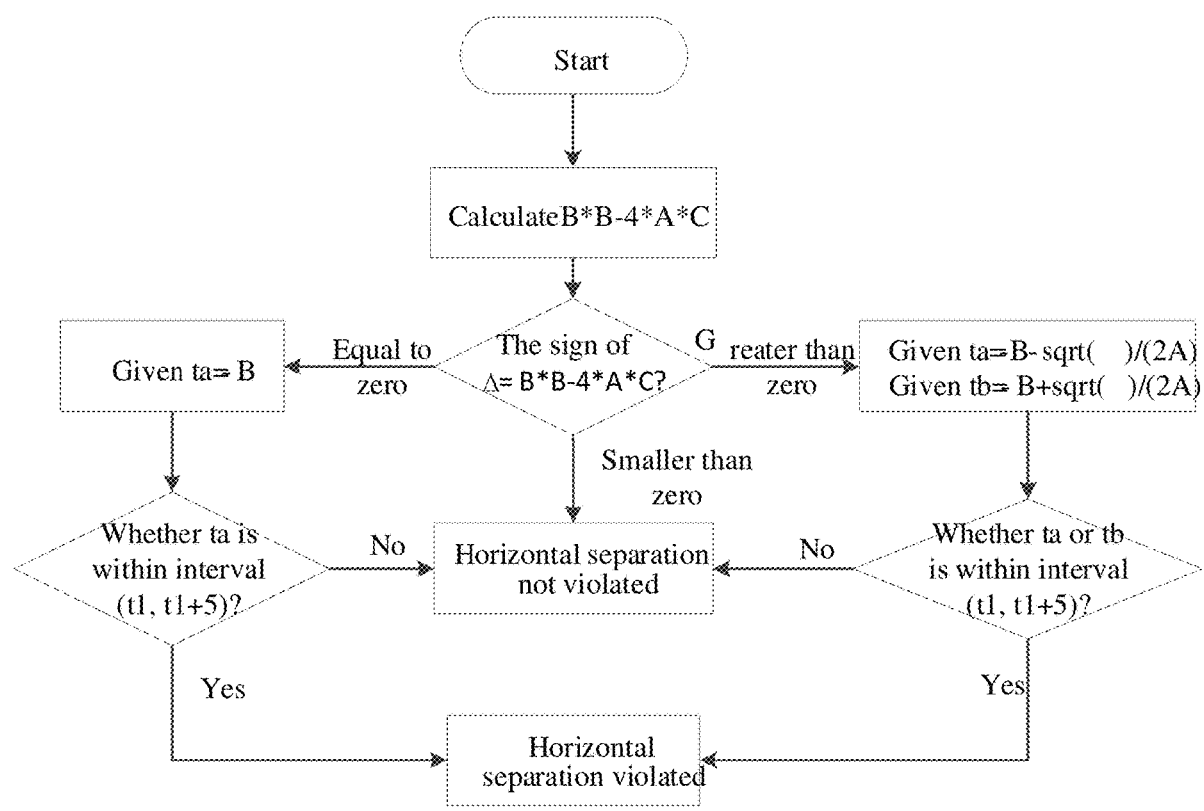
FIG. 10 illustrates a flowchart of determining a horizontal conflict.

At step 2, whether the horizontal separation standard is violated is determined. As shown in FIG. 10, whether the horizontal separation standard is violated is determined according to the following flow.

(1) Firstly, variables A, B and C are calculated, as shown in equations (9), (10) and (11).

$$A = \left(\frac{x3-x1}{s1} \cdot v1 - \frac{x4-x2}{s2} \cdot v2\right)^2 + \left(\frac{y3-y1}{s1} \cdot v1 - \frac{y4-y2}{s2} \cdot v2\right)^2 \quad (9)$$

$$B = 2 \cdot \left(\frac{x3-x1}{s1} \cdot v1 - \frac{x4-x2}{s2} \cdot v2\right) \cdot$$
$$\left(x1 - x2 - \frac{x3-x1}{s1} \cdot v1 \cdot t1 + \frac{x4-x2}{s2} \cdot v2 \cdot t1\right) +$$
$$2 \cdot \left(\frac{y3-y1}{s1} \cdot v1 - \frac{y4-y2}{s2} \cdot v2\right) \cdot$$
$$\left(y1 - y2 - \frac{y3-y1}{s1} \cdot v1 \cdot t1 + \frac{y4-y2}{s2} \cdot v2 \cdot t1\right) \quad (10)$$

$$C = \left(x1 - x2 - \frac{x3-x1}{s1} \cdot v1 \cdot t1 + \frac{x4-x2}{s2} \cdot v2 \cdot t1\right)^2 + \left(y1 - y2 - \frac{y3-y1}{s1} \cdot v1 \cdot t1 + \frac{y4-y2}{s2} \cdot v2 \cdot t1\right)^2 - d^2 \quad (11)$$

(2) Calculation of $\Delta = B^2 - 4AC$ is performed, and the sign of $\Delta$ is determined.

(3) When $\Delta = 0$, given ta=−B, whether ta is within interval (t1, t1+5) is determined. If yes, it indicates that the horizontal separation standard is violated; otherwise, it indicates that the horizontal separation standard is not violated. (4) When $\Delta > 0$, given ta=−B−$\sqrt{\Delta}$/(2A), tb=−B+$\sqrt{\Delta}$/(2A), whether ta or tb is within interval (t1, t1+5) is determined. If yes, it indicates that the horizontal separation standard is violated; otherwise, it indicates that the horizontal separation standard is not violated.

(5) When $\Delta < 0$, it indicates that the horizontal separation standard is not violated.

(d) Conflict Alert

Whether both a horizontal conflict and a vertical conflict exist, it is considered that a conflict exits, and an alert prompt is provided. An alert message includes flight numbers of two aircrafts, the time to collision, a predicted collision place, and the like.

(e) Illustration

Figure 11:
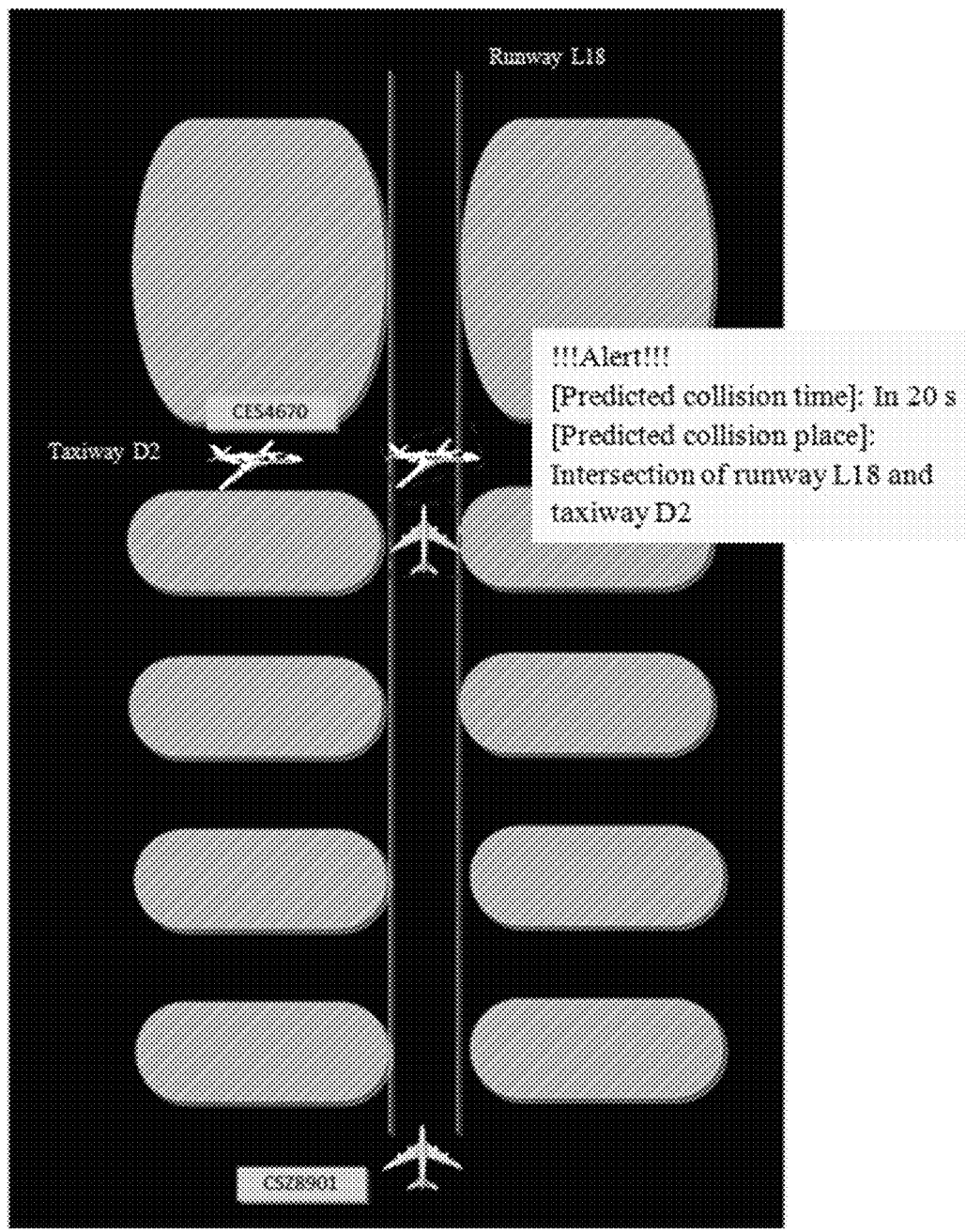
FIG. 11 illustrates a diagram of a conflict determination and alerting example.

As show in FIG. 11, in combination with the above example, the distance between the two aircrafts in 20 s is 100 m according to the conflict determination method (without consideration of height on the surface and the runway), which violates the separation standard, and a conflict prompt is provided.

The present invention provides a conflict alerting method based on control voice. There may be a lot of methods and ways to particularly implement the technical solutions, and the foregoing are merely descriptions of preferred embodiments of the present invention. It should be noted that for those of ordinary skill in the art, various improvements and modifications can be made without departing from the principles of the present invention. Such improvements and modifications should also be considered to fall into the scope of protection of the present invention. All components that are not clear in the implementation steps can be realized by the prior art.

What is claimed is:

1. A conflict alerting method based on control voice, comprising the following steps:
    step 1, collecting voice messages of a radio call between a controller and a pilot of a to-be-handled aircraft, setting interval time with a variable system parameter (VSP), determining whether the voice messages are a succession of control commands; if yes, inputting the succession of control commands into a voice line in port of an audio card of a control position via a record output port of a voice communication unit (VCU); otherwise, discarding such a succession of voice messages; and converting, by the audio card, analog voice signals into digital signals and sending the digital signals to a PC bus;
    step 2, converting the digital signals collected in step 1 into text messages, and sending the text messages of all computer interfaces together to a control system server;
    step 3, searching in contents of the text messages generated in step 2 according to a control command keyword set already created in a database of the control system server to obtain valid control commands including an aircraft call sign, a command action and an action adverbial;
        step 3-1, starting, by the control system server, a control command recognition program to read the contents of the text messages and search in the text messages for airline name in the control command keyword set; performing step 3-2 if an airline name is obtained; otherwise, determining the control command to be invalid; and
        step 3-2, searching in the text messages for a command action, and after a command action is obtained, using a letter, a digit and a unit before or after the command action as an action adverbial; determining the control command to be valid if a combination of an aircraft call sign, a command action and an action adverbial or a combination of an aircraft sign and a command action is obtained; otherwise, determining the control command to be invalid:
    step 4, associating related aircrafts based on the control commands extracted in step 3 in combination with existing aircraft messages in the control system server, and predicting a moving track of the to-be-handled aircraft from current time to future VSP time, thereby forming a predicted track; and
    step 5, determining whether the to-be-handled aircraft is in conflict with other aircraft in the control system based on the predicted track obtained in step 4 in combination with a current location, a motion state or a predicted track of other aircraft, and providing an alert prompt if a conflict exits.

2. The method according to claim 1, wherein the aircraft call sign in step 3 comprises an airline name and a flight number represented by three or four digits.

3. The method according to claim 1, wherein step 4 comprises the following steps:
    step 4-1, extracting a target identifier from the control commands, associating the identifier with all flight tracks in the system, finding the target to which the control commands are directed from system targets, and predicting a track of the target; and
    step 4-2, future moving track prediction: predicting a moving track in future VSP time by a direct extrapolation method and a prediction method in combination with basic air traffic management data.

4. The method according to claim 3, wherein in step 4-2, if a control command is changing of a motion position, a moving track in future VSP time is predicted by a track extrapolation method; and if a command is consistent with a planned track, a motion track is predicted based on the fusion of a real-time motion state and the planned track; this step specifically includes:

with consideration of the motion of the target in a two-dimensional plane, calculating $\dot{x}(t)$, $\dot{y}(t)$, $\dot{v}(t)$ and $\dot{\varphi}(t)$ according to the following two-dimensional target kinematic equations:

$$\begin{cases} \dot{x}(t) = v(t)\cos\varphi(t) \\ \dot{y}(t) = v(t)\sin\varphi(t) \\ \dot{v}(t) = a_q(t) \\ \dot{\varphi}(t) = a_f(t)/v(t) \end{cases},$$

wherein $\dot{x}(t)$ represents an x-direction speed; $\dot{y}(t)$ represents a y-direction speed; $\dot{v}(t)$ represents a tangential acceleration of the target; $\dot{\varphi}(t)$ represents a turning acceleration of the target; (x, y) represents a location of the target; v(t) represents a tangential speed of the target; $\varphi(t)$ represents an angle of heading change of the target; $a_q(t)$ and $a_f(t)$ represent a tangential acceleration and a normal acceleration of motion of the target, respectively; and t represents seconds relative to an initial state, ranging from 0 to 65535;

assuming that $a_q(t)=0$ and $a_f(t)$ is a constant, the motion of the target includes the following two forms:

when $a_f(t)=0$, the target is in linear motion;

when $a_f(t)\neq 0$, the target is in uniform curvilinear motion;

given $\omega=\dot{\varphi}(t)$, $\omega$ represents an angular speed of turning of the target;

an angular speed $\omega$ of turning of the target at moment k+1 is calculated by the following equation:

$$\omega_{k+1}=e^{-T/\tau_\omega}\omega_k+W_{\omega,k},$$

wherein $\omega_k$ represents an angular speed of turning at moment k; T represents a sampling interval; $\tau_\omega$ represents a time-dependent constant of the angular speed; and $W_{107,k}$ represents white noise;

a target extrapolation model is as shown in the following equation:

$$X_{k+1}=A(\omega)X_k+BW_k,$$

wherein $X_k=[x_k, v_{xk}, y_k, v_{yk}]^T$ and $x_k, v_{xk}, y_k, v_{yk}$ represent an x-direction location, an x-direction speed, a y-direction location and a y-direction speed of the target at moment k, respectively; $W_k$ represents white noise; and a noise matrix B is as shown in the following equation:

$$B = \begin{bmatrix} T^2/2 & T & 0 & 0 \\ 0 & 0 & T^2/2 & T \end{bmatrix}^T,$$

a transition matrix $A(\omega)$ which is obtained by discretizing the two-dimensional target kinematic equations is in two forms:

when $\omega=0$, $$A(\omega) = \begin{bmatrix} 1 & T & 0 & 0 \\ 0 & 1 & 0 & 0 \\ 0 & 0 & 1 & T \\ 0 & 0 & 0 & 1 \end{bmatrix},$$

when $\omega\neq 0$, $$A(\omega) = \begin{bmatrix} 1 & \sin\omega T/\omega & 0 & \cos\omega T - 1/\omega \\ 0 & \cos\omega T & 0 & -\sin\omega T \\ 0 & 1-\cos\omega T/\omega & 1 & \sin\omega T/\omega \\ 0 & \sin\omega T & 0 & \cos\omega T \end{bmatrix},$$

the x-direction location $x_k$, the x-direction speed $v_{xk}$, the y-direction location $y_k$ and the y-direction speed $v_{yk}$ of an extrapolated track at moment k are obtained by matrix calculation.

5. The method according to claim 3, wherein in step 4-2, if a control command contains messages which comprise aerodrome runway, runway holding point, taxiway, take-off procedure, landing procedure, stand, airway route, gate point, navigation point, and are used to predict a moving track in future VSP time.

6. The method according to claim 3, wherein step 5 comprises the following steps:

step 5-1, setting determination parameters including prediction time, a horizontal separation standard and a vertical separation standard, wherein the prediction time is the time of forward prediction of the system during conflict determination; the horizontal separation standard is a minimum horizontal separation that needs to be satisfied between aircrafts, and the vertical separation standard is a minimum vertical separation that needs to be satisfied between aircrafts, step 5-2, performing conflict pre-determination, excluding aircrafts that are moving away from the to-be-handled aircraft, and excluding aircrafts at a distance exceeding a particular range from the to-be-handled aircraft;

step 5-3, performing conflict determination on the to-be-handled aircraft and all other aircrafts: setting interval time of conflict determination until the set prediction time expires, determining whether horizontal separations between the to-be-handled aircraft and other aircrafts meet the horizontal separation standard, and determining whether vertical separations between the to-be-handled aircraft and other aircrafts meet the vertical separation standard, and determining that a conflict exits once simultaneous violation of the horizontal and vertical separation standards occurs at a time; and step 5-4, providing an alert prompt, wherein the alert prompt includes messages for flight numbers of two aircrafts, the time to collision, and a predicted collision place.

7. The method according to claim 6, wherein step 5-3 comprises the following steps:

step 5-3-1, denoting a current state of aircraft A by a tuple (x1,y1,v1,h1,t1), wherein (x1,y1) represents geographical projection coordinates of aircraft A at a current moment t1; v1 represents a speed of aircraft A at the current moment t1; and h1 represents a height of aircraft A at the current moment t1; denoting a current state of aircraft B by a tuple (x2,y2,v2,h2,t1), wherein (x2,y2) represents geographical projection coordinates of aircraft B at the current moment t1; v2 represents a speed of aircraft B at the current moment t1; and h2 represents a height of aircraft B at the current moment t1; performing extrapolation of maintained speed and heading in future 5 seconds on aircraft A and aircraft B, respectively, wherein the states of aircraft A and aircraft B after the extrapolation are (x3,y3,v1,h3,t1+5) and (x4,y4,v2,h4,t1+5), respectively; respective flying distances of aircraft A and aircraft B relative to the current moment after the extrapolation are denoted by s1 and s2, respectively; the horizontal separation standard is set to d, and the vertical separation standard is set to K;

step 5-3-2, determining whether the vertical separation standard is violated: if $|h1-h2| \geq K$, K representing the vertical separation standard, determining that the vertical separation standard is not violated, and ending the determination flow; otherwise, determining that the vertical separation standard is violated, and performing step 5-3-3; and step 5-3-3, determining whether the horizontal separation standard is violated:

calculating variables A, B and C by the following equations:

$$A = \left(\frac{x3-x1}{s1} \cdot v1 - \frac{x4-x2}{s2} \cdot v2\right)^2 + \left(\frac{y3-y1}{s1} \cdot v1 - \frac{y4-y2}{s2} \cdot v2\right)^2,$$

$$B = 2 \cdot \left(\frac{x3-x1}{s1} \cdot v1 - \frac{x4-x2}{s2} \cdot v2\right) \cdot$$

$$\left(x1 - x2 - \frac{x3-x1}{s1} \cdot v1 \cdot t1 + \frac{x4-x2}{s2} \cdot v2 \cdot t1\right) +$$

$$2 \cdot \left(\frac{y3-y1}{s1} \cdot v1 - \frac{y4-y2}{s2} \cdot v2\right) \cdot$$

$$\left(y1 - y2 - \frac{y3-y1}{s1} \cdot v1 \cdot t1 + \frac{y4-y2}{s2} \cdot v2 \cdot t1\right),$$

$$C = \left(x1 - x2 - \frac{x3-x1}{s1} \cdot v1 \cdot t1 + \frac{x4-x2}{s2} \cdot v2 \cdot t1\right)^2 +$$

$$\left(y1 - y2 - \frac{y3-y1}{s1} \cdot v1 \cdot t1 + \frac{y4-y2}{s2} \cdot v2 \cdot t1\right)^2 - d^2,$$

calculating $\Delta$ by the following equation:

$\Delta = B^2 - 4AC$, and determining a sign of $\Delta$:

if $\Delta = 0$, given ta=$-$B, determining whether ta is within an interval (t1,t1+5); if yes, determining that the horizontal separation standard is violated with a conflict exiting; otherwise, determining that the horizontal separation standard is not violated;

if $\Delta > 0$, given ta=$-$B$-\sqrt{\Delta}$/(2A), tb=$-$B $+\sqrt{\Delta}$/(2A), determining whether ta or tb is within an interval (t1,t1+5); if yes, determining that the horizontal separation standard is violated with a conflict exiting; otherwise, determining that the horizontal separation standard is not violated; and if $\Delta < 0$, determining that the horizontal separation standard is not violated.

* * * * *